United States Patent
Noji

(10) Patent No.: US 7,243,873 B2
(45) Date of Patent: Jul. 17, 2007

(54) WINDING METHOD OF MULTI POLAR ARMATURE AND WINDING APPARATUS OF SAME

(75) Inventor: Kaoru Noji, Iino-machi (JP)

(73) Assignee: Nittoku Engineering Kabushiki Kaisha, Saitama (JP)

( * ) Notice: Subject to any disclaimer, the term of this patent is extended or adjusted under 35 U.S.C. 154(b) by 0 days.

(21) Appl. No.: 11/219,828

(22) Filed: Sep. 7, 2005

(65) Prior Publication Data

US 2006/0169822 A1  Aug. 3, 2006

(30) Foreign Application Priority Data

Sep. 13, 2004  (JP) .............................. 2004-265494

(51) Int. Cl.
*H02K 15/0851*  (2006.01)

(52) U.S. Cl. ...................... 242/432; 242/432.2; 29/596

(58) Field of Classification Search .. 242/432.2–432.5, 242/444, 444.2–444.3, 445.1, 434.1; 29/596, 29/605

See application file for complete search history.

(56) References Cited

U.S. PATENT DOCUMENTS

| | | | | |
|---|---|---|---|---|
| 5,622,332 A | * | 4/1997 | Bennitt et al. | 242/439 |
| 5,964,429 A | * | 10/1999 | Burch et al. | 242/432.2 |
| 6,003,805 A | * | 12/1999 | Newman | 242/432.5 |
| 6,098,912 A | * | 8/2000 | Noji | 242/432.5 |
| 6,254,027 B1 | * | 7/2001 | Kunou | 242/432.4 |
| 6,533,208 B1 | * | 3/2003 | Becherucci et al. | 242/432.4 |
| 6,622,954 B2 | * | 9/2003 | Komuro et al. | 242/432.2 |
| 6,622,955 B2 | * | 9/2003 | Stratico et al. | 242/432.4 |
| 6,749,144 B2 | * | 6/2004 | Komuro et al. | 242/432.5 |
| 6,758,429 B2 | * | 7/2004 | Stratico et al. | 242/432.4 |
| 2002/0088892 A1 | * | 7/2002 | Komuro et al. | 242/432.3 |
| 2003/0085313 A1 | * | 5/2003 | Takano et al. | 242/432.2 |
| 2003/0106954 A1 | * | 6/2003 | Stratico et al. | 242/432.4 |
| 2003/0168547 A1 | * | 9/2003 | Komuro et al. | 242/432.5 |
| 2004/0055139 A1 | * | 3/2004 | Kuroyanagi et al. | 29/596 |
| 2005/0029385 A1 | * | 2/2005 | Stratico et al. | 242/432.2 |

FOREIGN PATENT DOCUMENTS

| | | |
|---|---|---|
| JP | 2701441 | 10/1997 |
| JP | 2003-204659 | 7/2003 |

* cited by examiner

*Primary Examiner*—Emmanuel Marcelo
*Assistant Examiner*—Evan H. Langdon
(74) *Attorney, Agent, or Firm*—Rabin & Berdo, P.C.

(57) ABSTRACT

In a winding apparatus (1) of a stator (multi polar armature) winding a bundle of plural wire rods (5) on a circular core in which teeth (winding core) (9) are arranged circularly, an index mechanism (11) rotating the circular core (8) around its central axis, a core turning mechanism (30) turning the index mechanism (11), a nozzle (3) reeling out a plurality of wire rods (5), and a nozzle travel mechanism (15) traveling the nozzle in the three dimensional directions are provided. The index mechanism (11) and the nozzle travel mechanism (15) travel the nozzle (3) around each tooth (9) to wind the wire rods around each tooth (9), as well as the core turning mechanism (30) turns the index mechanism (11) and also the circular core (8) to eliminate the twist produced in the wire rods (5) wound around tooth (9).

9 Claims, 5 Drawing Sheets

WINDING METHOD OF MULTI POLAR ARMATURE AND WINDING APPARATUS OF SAME

FIELD OF THE INVENTION

The present invention relates to an improvement of a winding method of winding wire rods around a multi polar armature such as a stator or a rotor, and a winding apparatus of the same.

BACKGROUND OF THE INVENTION

There is generally known that a lamination factor (density) of a winding is increased by winding a plurality of wire rods instead of a single wire rod.

A winding apparatus disclosed in Japanese Unexamined Patent Publication No. 2003-204659 is arranged in such a manner that the winding apparatus is provided with a nozzle in which a plurality of guide holes are formed for inserting wire rods therein and this nozzle is traveled around each tooth (winding core) to form a bundle made of a plurality of the wire rods reeled out from the respective guide holes, which is wound around each tooth of the stator.

A winding apparatus disclosed in Japanese Patent No. 2701441 is constructed in such a way that a nozzle itself rotates in synchronization with travel of the nozzle around a winding core, thereby preventing wire rods from being twisted.

SUMMARY OF THE INVENTION

According to the winding apparatus disclosed in Japanese Unexamined Patent Publication No. 2003-204659, however, when the nozzle is traveled around each tooth to wind the wire rod around each tooth once, the twist of each wire rod is produced one time. Therefore, when the twist portion of the wire rod is produced in the slot between the teeth, the lamination factor of the wire rod is remarkably decreased to deteriorate a performance of the motor.

According to the winding apparatus disclosed in Japanese Patent No. 2701441, when the nozzle is rotated, although the twist of the wire rods between the nozzle and the winding core is not produced, the twist thereof is produced between the nozzle and a supply source of the wire rods.

In order to eliminate the twist of the wire rods, it is required to rotate the supply source of the wire rods in synchronization with rotation of the nozzle. However, a mechanism to rotate the supply source of the wire rods including this tension apparatus is very large and complicated, and therefore, is not suitable for a practical use.

The present invention has been made from the foregoing problems and has an object of putting to practical use a winding method and a winding apparatus of a multi polar armature which eliminate twist of wire rods.

In order to achieve above object, this invention provides a winding apparatus of a multi polar armature winding a bundle of a plurality of wire rods on a circular core in which a plurality of winding cores are arranged circularly. The winding apparatus of a multi polar armature comprises an index mechanism to rotate the circular core around a central axis thereof, a nozzle to reel out the plurality of the wire rods, and a nozzle travel mechanism to travel the nozzle, wherein, the nozzle travels around the winding cores to wind the wire rods around the winding cores, and the circular core turns substantially around a portion where the wire rods are wound, to eliminate twist produced in the wire rods.

The details as well as other features and advantages of this invention are set forth in the remainder of the specification and are shown in the accompanying drawings.

DESCRIPTION OF THE PREFERRED EMBODIMENTS

Figure 1:
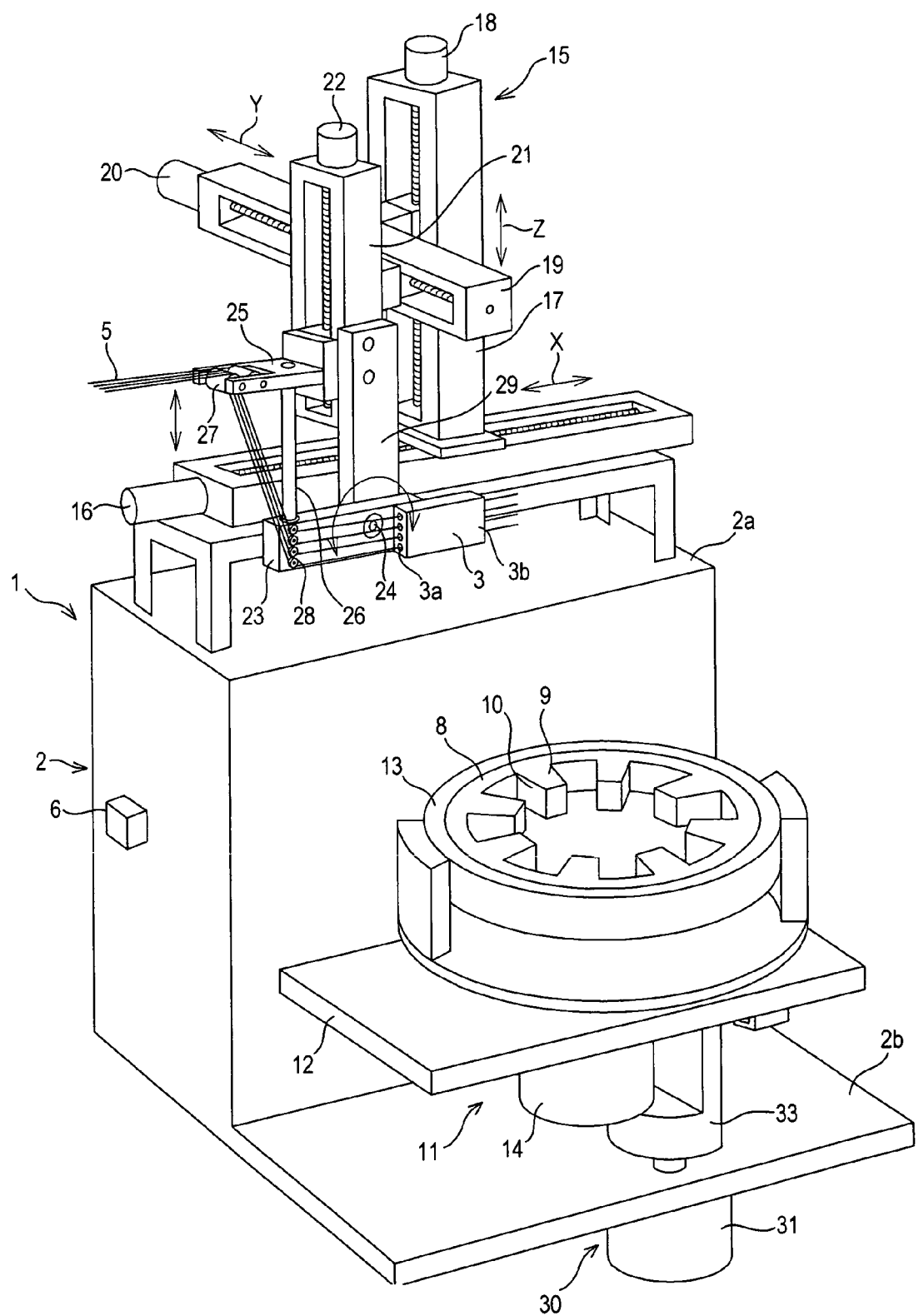
FIG. 1 is a perspective view showing a winding apparatus in a preferred embodiment according to the present invention.

Preferred embodiments of the present invention will be explained with reference to the drawings. It will be apparent to those skilled in the art from this disclosure that the following description of the preferred embodiments of the present invention is provided for illustration only, and not for the purpose of limiting the present invention as defined by the appended claims and their equivalents.

A winding apparatus 1 is an inner type apparatus which automatically winds wire rods 5 around a plurality of teeth (winding cores) 9 in a core 8 defining a stator (multi polar armature) of an inner rotor type motor. The teeth 9 are projected side by side in an inside of a circular yoke, and a slot 10 are disposed between the teeth 9 in such a way as to be opened to an inside.

An arrangement of the winding apparatus 1 will be hereinafter explained. Three axes as X, Y, and Z perpendicular to each other are set where it is explained that an X axis extends in a substantially horizontal, front-rear direction, a Y axis extends in a substantially horizontal, lateral direction, and a Z axis extends in a substantially vertical direction.

The winding apparatus 1 is provided with an index mechanism 11 which rotates the core 8 around a central axis thereof, a core turning mechanism 30 which turns the index mechanism 11, as well as the core 8, a nozzle 3 which reels out wire rods 5, and a nozzle travel mechanism 15 which moves the nozzle 3 in three dimensional directions. And the winding apparatus 1 is controlled in such a way that the index mechanism 11 and the nozzle travel mechanism 15 travel the nozzle 3 around the respective teeth 9 to wind the wire rods around the respective teeth 9, as well as the core turning mechanism 30 turns the index mechanism 11 and the core 8 around a portion where the wire rods 5 are wound, thereby eliminating the twist produced in the wire rods 5.

The winding apparatus 1 is disposed on a stand 2 provided with an upper board 2a and a lower board 2b. The index mechanism 11 and the core turning mechanism 30 are mounted in the lower board 2b and the nozzle travel mechanism 15 is placed on the upper board 2a.

Figure 2:
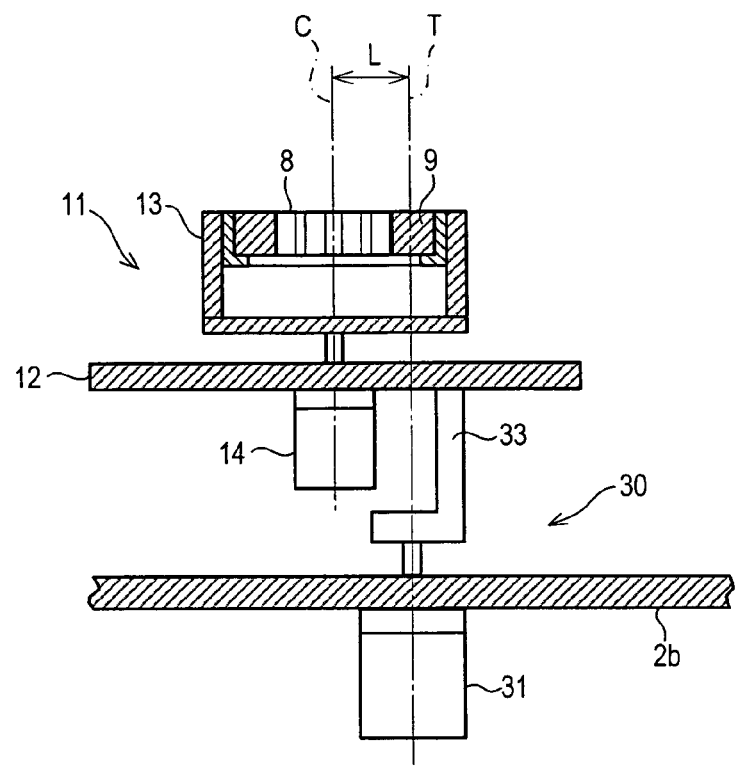
FIG. 2 is a view showing an arrangement view showing a core turning mechanism of the same.

As shown in FIG. 2, the index mechanism 11 is provided with a core support board 13 supporting the core 8, a servo motor 14 rotating/driving the core support board 13, and an index board 12 to which the servo motor 14 is fixed. In FIG. 2, "C" is a central axis of the core 8. Since the servo motor 14 is fixed to the index board 12 in such a way that a rotation axis of the servo motor 14 corresponds to the central axis C of the core 8, the core 8 rotates around the central axis C.

The core turning mechanism 30 is provided with a connecting member 33 connected to the index board 12, and the servo motor 31 rotating/driving the connecting member 33. The servo motor 31 is fixed to the lower board 2b of the stand 2.

In FIG. 2, "T" is a central axis extending in the Z axis direction, which passes through a central portion of the slot 10 through which the wire rods 5 extending from the nozzle 3 pass. The servo motor 31 is fixed to the lower board 2b in such a way that the rotating axis of the servo motor 31 corresponds to the central axis T. Accordingly, driving the servo motor 31 causes the index board 12 to turn around the central axis T via the connecting member 33. This allows the core 8 to turn around the central axis T. In this way, the core turning mechanism 30 turns the index mechanism 11 and also the core 8.

The central axis C around which the index mechanism 11 rotates the core 8 is offset by a predetermined distance L from the central axis T around which the core turning mechanism 30 turns the index mechanism 11.

Figure 3:
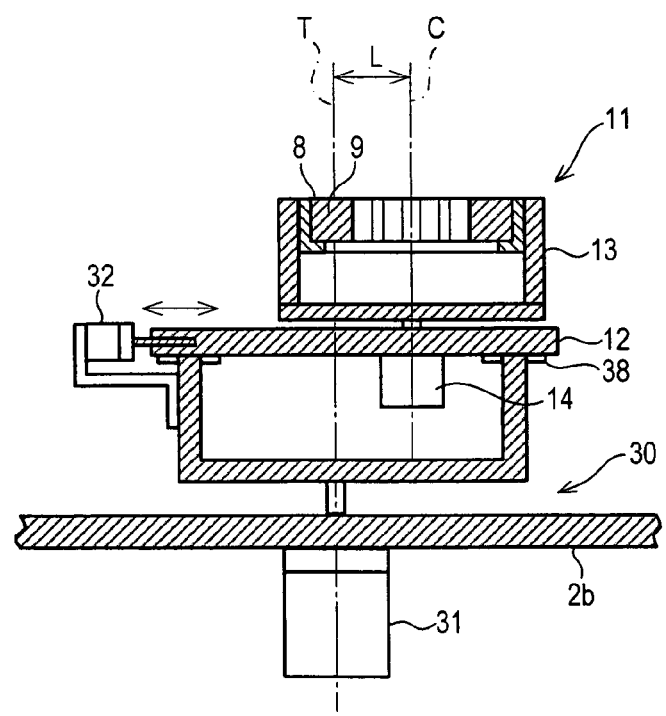
FIG. 3 is a view showing an arrangement view showing a core turning mechanism of the same.

As shown in FIG. 3, the core turning mechanism 30 slidably supports the index board 12 via a bearing 38 and also may be provided with an electromagnetic actuator 32 traveling the index board 12. In this case, the offset amount L between the index mechanism 11 and the core turning mechanism 30 is optionally varied in accordance with a size of the core 8 by traveling the index board 12, so that a core 8 of various sizes can be used.

The nozzle travel mechanism 15 is provided with a front-rear travel board 17 traveling in the X axis direction along the upper board 2a of the stand 2 by an electromagnetic actuator 16, an elevating board 19 traveling in the Z axis direction along the front-rear travel board 17 by an electromagnetic actuator 18, a lateral travel board 21 traveling in the Y axis direction along the elevating board 19 by an electromagnetic actuator 20, a driven member 25 traveling in the Z axis direction along the lateral travel board 21 by an electromagnetic actuator 22, and an oblique moving board 23 supported to a base sheet 29 fixed to the lateral travel board 21 in such a way as to be rotated around the Y axis via an axis 24. The nozzle 3 is fixed to the oblique moving board 23.

The driven member 25 and one end of the oblique moving board 23 are connected via a link 26. Accordingly, when the driven member 25 elevates by the electromagnetic actuator 22, the oblique moving board 23 rotates via the link 26.

Rotation of the oblique moving board 23 by the link mechanism in this way allows reduction of a space surrounding the oblique moving board 23, so that the oblique moving board 23 can be inserted in a space limited inside the core 8.

In addition, a structure for driving the oblique moving board 23 is not limited to this link mechanism, but may be, for example, a mechanism formed of a gear or the like.

A plurality of wire rods 5 are supplied to the nozzle 3 from a wire rod supply apparatus (not shown). The nozzle 3 reels out the plurality of the wire rods 5 and at the same time, travels around the teeth 9, whereby the plurality of the wire rods 5 get together to form a bundle, which is wound around the teeth 9. By winding the plurality of the wire rods 5 instead of the single wire rod, the lamination factor (density) of the winding is increased to improve a motor performance.

The nozzle 3 is formed in a sheet shape so that the nozzle 3 can be inserted through the slot 10 between the teeth 9 and formed of a plurality of guide holes 3a into which each wire rod 5 is inserted. The respective guide holes 3a are arranged and opened in a line in the Z axis direction by a predetermined distance.

A roller 27 is disposed in the driven member 25 and a plurality of pulleys 28 are disposed in the oblique moving board 23. Each wire rod 5 is guided in each guide hole 3a of the nozzle 3 via the roller 27 and each pulley 28. A predetermined tension is given to each wire rod 5 from the wire rod supply apparatus via a tension apparatus (not shown).

Each electromagnetic actuator 16, 18, 20, 22 is formed of a ball screw rotated/driven by the servo motor and a driven member screwed into the ball screw to be traveled in parallel or the like.

The winding apparatus 1 is provided with a controller 6 controlling operations of each electromagnetic actuator 16, 18, 20, and 22, the servo motors 14 and 31.

The controller 6 operates the electromagnetic actuators 16, 18, 20, and 22, the servo motors 14 and 31, and the like to control operations of the nozzle travel mechanism 15 and the index mechanism 11. Hereby, the nozzle 3 is traveled through the slot 10 around the tooth 9 to wind the wire rods 5 reeled out from the nozzle 3 around the tooth 9.

The controller 6 operates the electromagnetic actuator 22 and thereby, controls directions of a top end 3b of the nozzle 3 fixed to the oblique moving board 23. In detail, in a case where the nozzle 3 reels out the respective wire rods 5 and goes down through the slot 10, the oblique moving board 23 is rotated in such a way as to direct the top end 3b of the nozzle 3 upwards. On the other hand, in a case where the nozzle 3 elevates, the oblique moving board 23 is rotated to direct the top end 3b of the nozzle 3 downwards.

That is, the controller 6 controls operations of the electromagnetic actuator 22 and rotates the nozzle 3 in the direction where the wire rods 5 reeled out through the respective guide holes 3a are separated from each other.

The controller 6 drives the core turning mechanism 30 each time when each wire rod 5 reeled out from the nozzle 3 is wound around the tooth 9 one time, thereby to turn the index mechanism 11 together with the core 8 one time, and thus the twist produced in the each wire rod 5 is controlled to be eliminated.

Next, operations for winding wire rods 5 around the core 8 by the winding apparatus 1 will be explained.

First, the core 8 is placed on the core support board 13, concave and convex portions formed in the core 8 and the core support board 13 are engaged with each other, and the core 8 is set in a given position.

Top ends of the wire rods reeled out from the top end 3b of the nozzle 3 are held by a clamp (not shown).

The nozzle travel mechanism 15 and the index mechanism 11 are operated. With this, the nozzle 3 travels via the slot 10 around the tooth 9, and each wire rod 5 reeled out from the top end 3b of the nozzle 3 is wound around the tooth 9.

Figure 4:
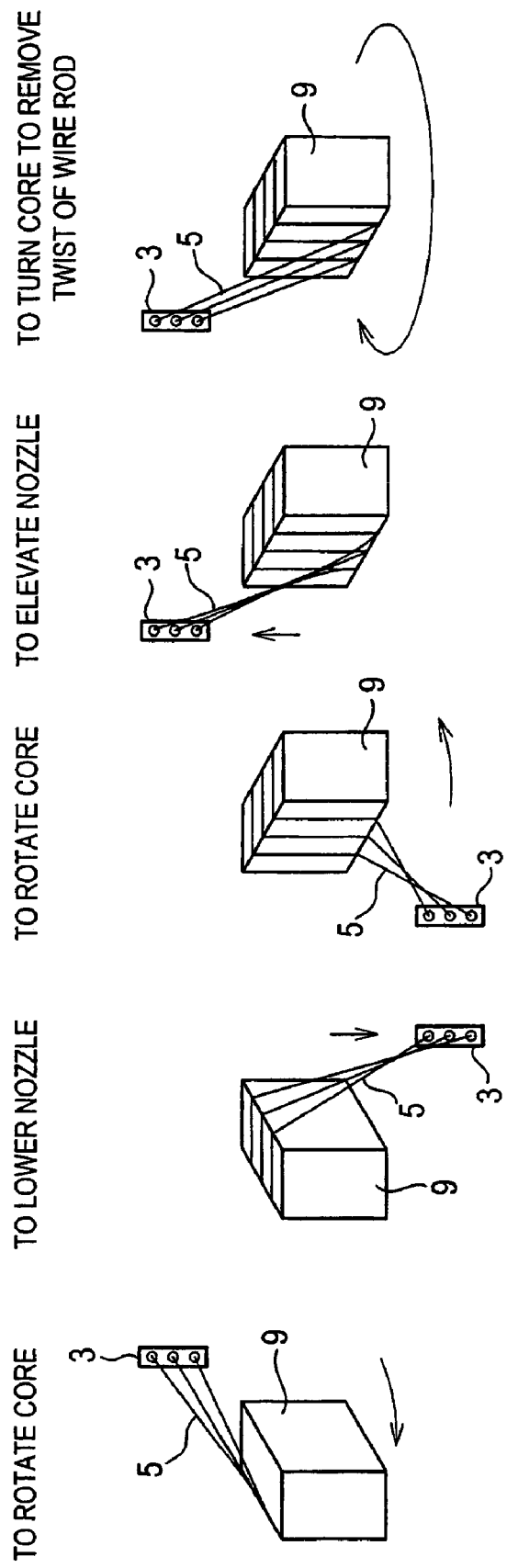
FIG. 4A is an explanation view showing a winding operation of rotating a core of the same.
FIG. 4B is an explanation view showing a winding operation of descending a nozzle of the same.
FIG. 4C is an explanation view showing a winding operation of rotating the core of the same.
FIG. 4D is an explanation view showing a winding operation of elevating the nozzle of the same.
FIG. 4E is an explanation view showing a winding operation of turning the core to eliminate twist of wire rods of the same.

In more detail of this winding operation, as shown in FIG. 4A, the core 8 is rotated via the index mechanism 11 and the slot 10 is disposed right under the nozzle 3.

Next, as shown in FIG. 4B, the nozzle 3 is lowered through the slot 10 by driving the nozzle travel mechanism 15. In a case where the nozzle 3 thus reels out the respective wire rods 5 and at the same time descends through the slot 10, the oblique moving board 23 is rotated in such a way that the top end 3b of the nozzle 3 is directed upwards. In this way, friction between each wire rod 5 reeled out from the nozzle 3 is reduced to effectively prevent wire rods from entangling.

Next, as shown in FIG. 4C, the core 8 is rotated by driving the index mechanism 11 and the slot 10 is disposed right above the nozzle 3.

Next, as shown in FIG. 4D, the nozzle 3 is elevated through the slot 10 by driving the nozzle travel mechanism 15. In a case where the nozzle 3 thus reels out the respective wire rods 5 and at the same time elevates through the slot 10, the oblique moving board 23 is rotated in such a way that the top end 3b of the nozzle 3 is directed downwards. In this way, friction between each wire rod 5 reeled out from the nozzle 3 is reduced to effectively prevent wire rods 5 from entangling.

Next, as shown in FIG. 4E, by driving the core turning mechanism 30 the index mechanism 11 is rotated together with the core 8 one time to eliminate the twist produced in the each wire rod 5.

When the nozzle 3 makes a circuit of the tooth 9 in the processes shown in FIGS. 4A, 4B, 4C, and 4D, each wire rod 5 reeled out from the nozzle 3 is wound around the tooth 9 one time. However, as a result, there occurs the twist of the respective wire rods 5 reeled out from the nozzle 3, which therefore, cross with each other. As a countermeasure against this, as shown in FIG. 4E, the index mechanism 11 is rotated one time together with the core 8 by driving the core turning mechanism 30, to eliminate the twist produced in the each wire rod 5. By sequentially repeating operations in FIGS. 4A, 4B, 4C, 4D, and 4E, each wire rod 5 is wound around the tooth 9 without the twist of the respective wire rods 5.

The controller 6, in the process of driving the core turning mechanism 30 and turning the index mechanism 11 together with the core 8, travels the nozzle 3 in the X axis direction (radial direction of the core 8) and controls the travel of the wire rods 5 extending from the nozzle 3 to the teeth 9. The electromagnetic actuator 16 or the electromagnetic actuator 32 is used as a device traveling the nozzle 3 in the X axis direction.

When each wire rod 5 is thus wound around one tooth 9 by a predetermined times, the index mechanism 11 is driven to rotate the core 8 by a predetermined angle, and then, the wire rods 5 are wound around another tooth 9 by repetition of the above operation.

Note that the winding direction of the wire rods 5 to each tooth 9 is different depending on a specification of the stator, that is, there is a method of winding the wire rods in the same direction on all teeth 9, or of alternately changing the winding direction to each tooth 9.

When the winding with respect to all the teeth 9 is completed, the respective wire rods 5 reeled out from the nozzle 3 are held by the clamp (not shown), and then, cut before the clamp, and finally the core 8 is removed from the core support board 13.

As described above, the winding apparatus 1 is arranged in such a manner that the index mechanism 11 and the nozzle travel mechanism 15 travel the nozzle 3 around each tooth 9 to wind the wire rods 5 around each tooth 9, as well as the core turning mechanism 30 turns the index mechanism 11 and also the core 8 to eliminate the twist produced in the wire rods 5 wound around teeth 9. This allows each wire rod 5 to be wound around the tooth 9 without the twist thereof to increase a lamination factor of the winding and improve a motor performance. It is not required to turn a wire rod supply source, thereby avoiding large-sizing of the winding apparatus.

When the core turning mechanism 30 turns the core 8 in a state where the wire rods 5 extending from the nozzle 3 are wound around the teeth 9, the winding portion of the wire rod 5 turns around the central axis T (central portion of the slot 10). By traveling the nozzle 3 in the X axis direction corresponding to this, travel of wire rod 5 extending from the nozzle 3 to the tooth 9 is restricted, so that the wire rod 5 can be wound at a predetermined position around the tooth 9.

Further, the winding apparatus 1 is constructed in such a manner that when the nozzle 3 reels out the respective wire rods 5 and at the same time, descends through the slot 10, the oblique moving board 23 is rotated in such a way as to direct the top end 3b of the nozzle 3 upwards, and on the other hand, when the nozzle 3 elevates, the oblique moving board 23 is rotated in such a way as to direct the top end 3b of the nozzle 3 downwards. This reduces friction between wire rods 5 reeled out from the nozzle 3 to effectively prevent the wire rods 5 from entangling with each other and improve the lamination factor of the winding.

In the above-described embodiment, however, in the process when the nozzle 3 travels in the upward-downward direction during winding operation, when loose occurs in the respective wire rods 5 reeled out in a bundle form from the nozzle 3, portions where the respective wire rods 5 wound around the tooth 9 cross with each other tend to be produced, thereby possibly reducing the lamination factor of the winding.

Figure 5:
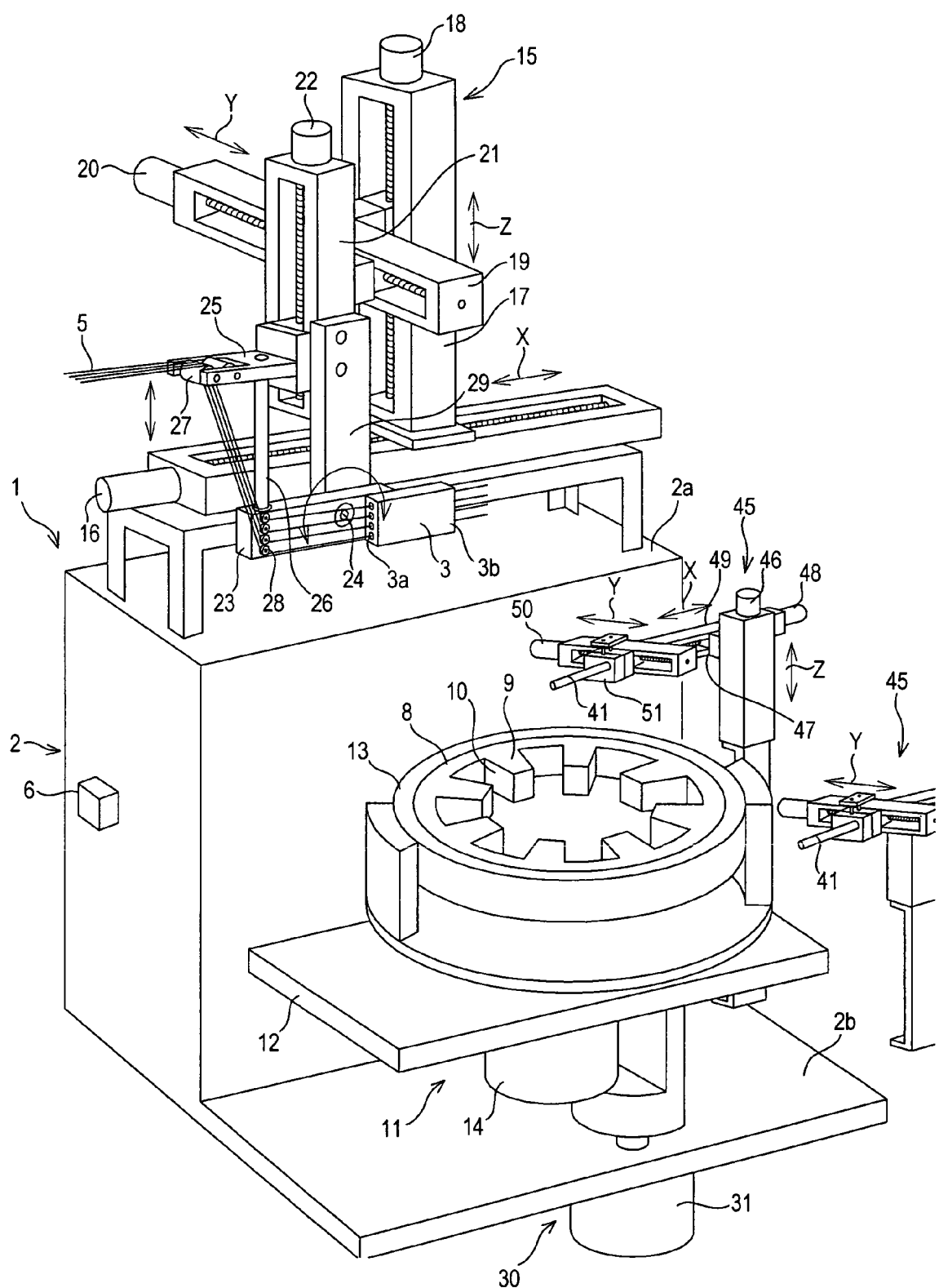
FIG. 5 is a perspective view showing a winding apparatus in another preferred embodiment according to the present invention.

Therefore, a winding apparatus 1 shown in FIG. 5, is provided with an upper and a lower guide pin 41 disposed along both ends of the tooth 9 and two guide pin mechanisms 45 traveling the guide pins 41 in the three dimensional directions and is constructed in such a manner that, after each wire rod 5 reeled out from the nozzle 3 is hooked on the guide pin 41 once, the guide pin 41 is removed to drop each wire rod 5 to the tooth 9. This prevents the respective wire rods 5 from being loosened.

The guide pin travel mechanism 45 is provided with an elevating board 47 traveling in the Z axis direction by an electromagnetic actuator 46, a front-rear traveling board 49 traveling in the X axis direction to the elevating board 47 by an electromagnetic actuator 48, a base board 51 traveling in the Y axis direction to the front-rear traveling board 49 by an electromagnetic actuator 50. The guide pin 41 is disposed in the base board 51.

When the winding apparatus 1 winds the wire rods 5 around core 8, the upper and the lower guide pin 41 are disposed side by side in the upward-downward direction in such a way as to put the common tooth 9 therebetween by each guide pin travel mechanism 45.

Winding operations of the winding apparatus 1 shown in FIG. 5 will be explained.

Figure 6D:
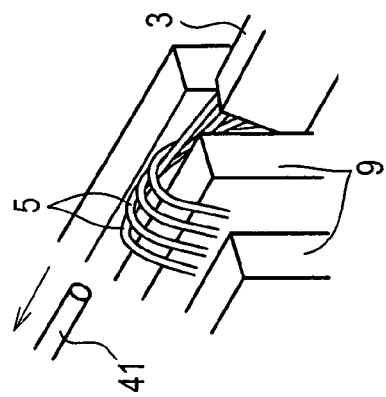
FIGS. 6A, 6B, 6C, and 6D are explanation views showing winding operations of the same.
Figure 6C:
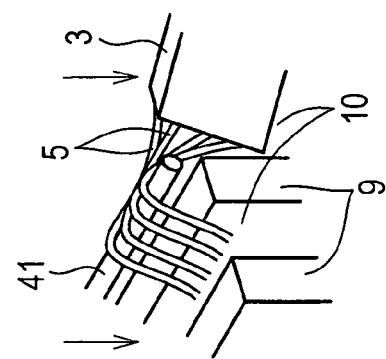
Figure 6B:
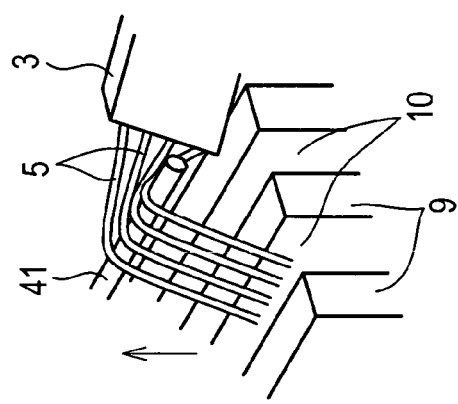
Figure 6A:
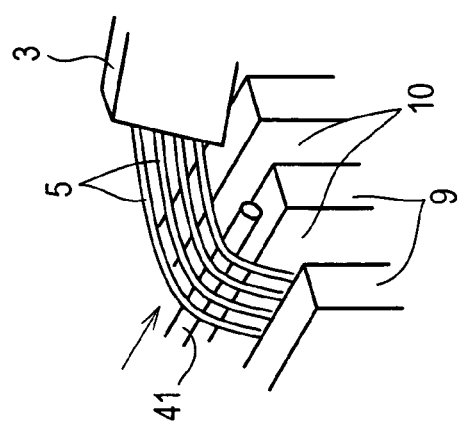

First, the nozzle 3, as shown in FIG. 6A, elevates through the slot 10 and further, the core 8 is rotated by driving the index mechanism 11, whereby the nozzle 3 travels to the center of the neighboring slot 10. At this time, the guide pin 41 is inserted along an upper end of the tooth 9.

Subsequently, as shown in FIG. 6B, the guide pin 41 elevates, thereby to arrange the respective wire rods 5 hooked on the guide pin 41 to be placed in one row, lower the coil end, and prevent loose of the wire rods 5.

Next, as shown in FIG. 6C, the nozzle 3 descends inside the slot 10, as well as the guide pin 41 descends in such a way as to prevent the loose of each wire rod 5 hooked on the guide pin 41. The controller 6 controls the nozzle 3 and the guide pin 41 to travel in synchronization with each other, thereby preventing occurrence of the loose of each wire rod 5.

Next, as shown in FIG. 6D, the nozzle 3 descends through the slot 10, the guide pin 41 travels in the axial direction for removal, thereby to drop the respective wire rods 5 hooked on the guide pin 41 on the tooth 9 and prevent occurrence of the loose of the respective wire rods 5.

In the process when the nozzle 3 turns back from downwards to upwards, the each wire rod 5 reeled out from the nozzle 3 is hooked on the guide pin 41 once the same as the above. Then, the guide pin 41 is removed to drop the respective wire rods 5 on the tooth 9 and prevent occurrence of the loose of the respective wire rods 5.

In this way, the nozzle 3 turns back in such a manner that the respective wire rods 5 are not loosened by the guide pin 41, thereby preventing occurrence of portions where the respective wire rods 5 wound around the tooth 9 cross at the coil ends with each other. As a result, the respective wire rods 5 are wound around the tooth 9 without the twist thereof via the core turning mechanism 30, as well as it is effectively prevented that the wire rods 5 are entangled and therefore, it is possible to increase the lamination factor of the winding.

In addition, a spring urging the guide pin 41 in the direction for providing tension to the respective wire rods 5 may be added to prevent occurrence of the loose of the respective wire rods 5.

Further, as an alternative embodiment, the winding apparatus 1 may be arranged in such a manner that the index mechanism 11 and the nozzle travel mechanism 15 operate in synchronization with each other. In this case, the controller 6, in the process where the index mechanism 11 rotates the core 8 around the central axis, controls the nozzle travel mechanism 15 to travel the nozzle 3 in the X axis and Y axis directions, thus following the portion where the wire rod 5 is wound.

With this, the winding apparatus 1 can eliminate the twist produced in the wire rod 5 wound around the tooth 9 without use of the core turning mechanism 30. The winding apparatus 1 is capable of eliminating the core turning mechanism 30 and achieving simplification of the structure.

As describe above, the inner type winding apparatus of winding the wire rods on the core defining the stator of the inner rotor type motor is explained, but the present invention is not limited to this and can be applied to an outer type winding apparatus of winding wire rods on a core defining a stator of an outer rotor type motor.

This application claims priority to Japanese Patent Application No. 2004-265494. The entire disclosure of Japanese Patent Application No. 2004-265494 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the preferred embodiments according to the present invention is provided for illustration only, and not for the purpose of limiting the invention as defined by the appended claims and their equivalents.

What is claimed is:

1. A winding method of a multi polar armature winding a bundle of a plurality of wire rods on a circular core in which a plurality of winding cores are arranged circularly, comprising the steps of:
   providing an index mechanism to rotate the circular core around a central axis thereof;
   providing a nozzle to reel out the plurality of the wire rods;
   providing a nozzle travel mechanism to travel the nozzle;
   traveling the nozzle around the winding cores to wind the wire rods around the winding cores; and
   turning the circular core substantially around an axis that is offset from the central axis of the circular core, to wind the wire rods around at least one winding core of the circular core, to eliminate twist produced in the wire rods.

2. A winding apparatus of a multi polar armature winding a bundle of a plurality of wire rods on a circular core in which a plurality of winding cores are arranged circularly, comprising:
   an index mechanism to rotate the circular core around a central axis thereof;
   a nozzle to reel out the plurality of the wire rods; and
   a nozzle travel mechanism to travel the nozzle, wherein:
   the nozzle travels around the winding cores to wind the wire rods around the winding cores; and
   a core turning mechanism to turn the circular core substantially around an axis that is offset from the central axis of the circular core, to wind the wire rods around at least one winding core of the circular core, to eliminate twist produced in the wire rods.

3. The winding apparatus of the multi polar armature according to claim 2,
   wherein the core turning mechanism turns the index mechanism and the circular core for eliminating the twist produced in the wire rods.

4. The winding apparatus of the multi polar armature according to claim 3, wherein:
   the core turning mechanism turns the index mechanism and the circular core such that the nozzle travels relatively in a radial direction to restrict travel of the wire rods extending from the nozzle to the winding cores.

5. The winding apparatus of the multi polar armature according to claim 2, wherein:
   the nozzle is provided with a plurality of guide holes opened for insert of the wire rods; and
   the nozzle travel mechanism is arranged in such a manner that the nozzle is rotated to separate the wire rods reeled out from each guide hole with each other.

6. The winding apparatus of the multi polar armature according to claim 2, further comprising:
   a guide pin disposed along an end of the winding core; and
   a guide pin travel mechanism to travel the guide pin, wherein:
   after each of the wire rods reeled out from the nozzle is hooked on the guide pin once, the guide pin is removed to drop each of the wire rods on the winding core.

7. The winding apparatus of the multi polar armature according to claim 6 wherein:
   the nozzle is provided with a plurality of guide holes opened for insert of the wire rods; and the nozzle travel mechanism is arranged in such a manner that the nozzle is rotated to separate the wire rods reeled out from each guide hole with each other.

8. The winding apparatus of the multi polar armature according to claim 2, wherein in turning the circular core substantially around a portion of the circular core where the wire rods are wound, the core turning mechanism rotates the circular core substantially around an axis passing through the portion of the circular core where the wire rods are wound.

9. The winding method of a multi polar armature winding according to claim 1, wherein the step of turning the circular core substantially around a portion of the circular core where the wire rods are wound further comprises rotating the circular core substantially around an axis passing through the portion of the circular core where the wire rods are wound.

* * * * *